UNITED STATES PATENT OFFICE.

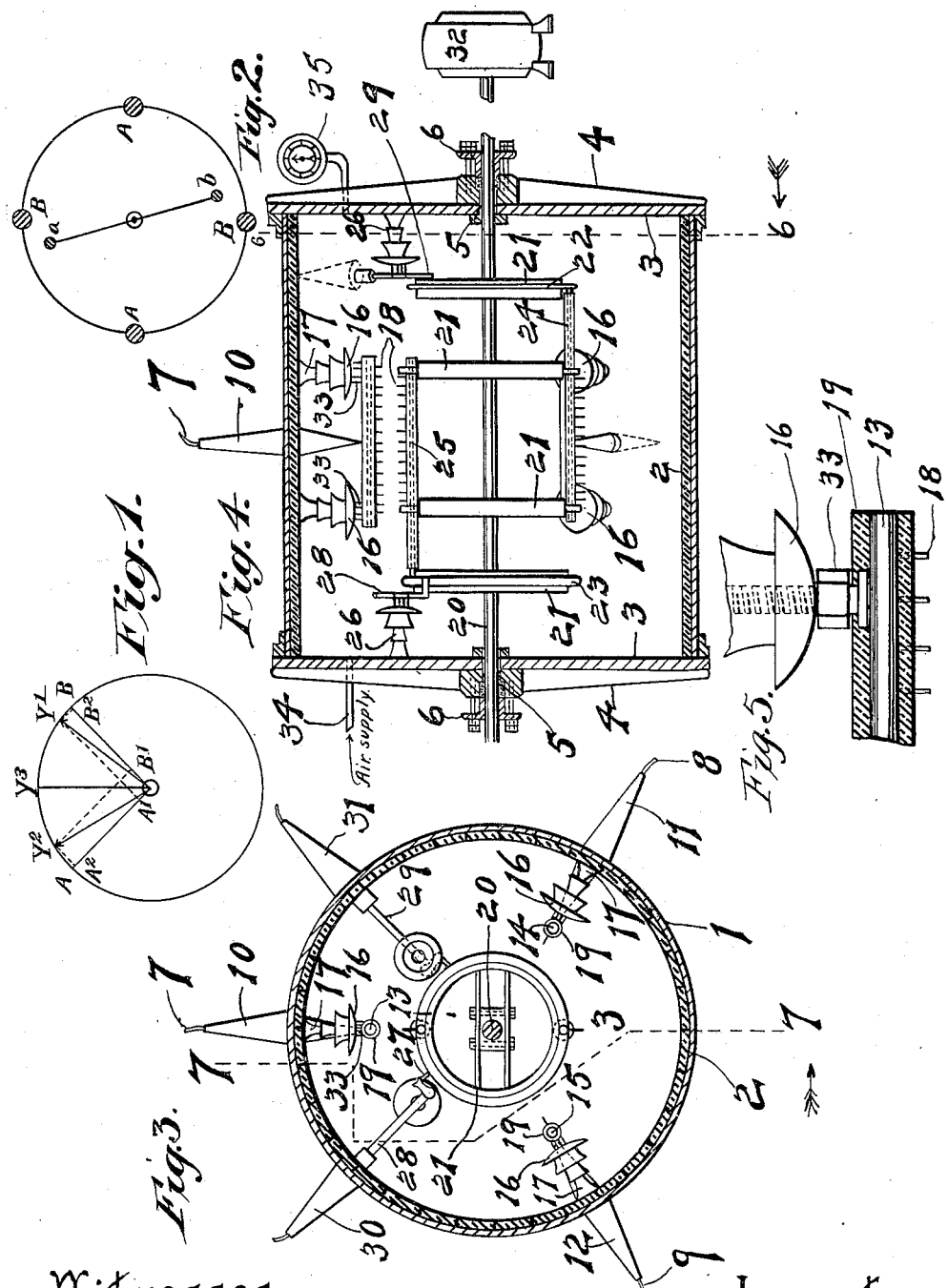

RALPH W. LOHMAN, OF OAKLAND, CALIFORNIA.

METHOD AND APPARATUS FOR CONVERTING ALTERNATING OR PULSATING ELECTRIC CURRENTS INTO UNIDIRECTIONAL CURRENTS.

1,143,213.   Specification of Letters Patent.   Patented June 15, 1915.

Application filed May 22, 1909. Serial No. 497,634.

*To all whom it may concern:*

Be it known that I, RALPH W. LOHMAN, a citizen of the United States, residing at Oakland, in the county of Alameda and State of California, have invented a new and useful Method and Apparatus for Converting Alternating or Pulsating Electric Currents into Unidirectional Currents, of which the following is a specification in such full and clear terms as will enable those skilled in the art to construct and use the same.

This invention relates to a method and apparatus for the production of electric pressure waves of one character from alternating or pulsating electric pressure waves of a different character.

In the drawings, in which the same numeral of reference is applied to the same portion throughout, Figure 1 is a vector diagram illustrating the resultant rotating field occurring when two fields are properly compounded. Fig. 2 is a diagram of a series of loops of conductors placed in planes at 90° to each other and two conductors adapted to revolve in proximity to said conductors. Fig. 3 is a cross section of a machine adapted to carry out the invention. Fig. 4 is a longitudinal section through said machine and Fig. 5 is an enlarged detailed view of certain parts, partly in section.

With apparatus constructed according to this invention uni-directional, continuous, practically non-pulsating, or pulsating, discontinuous, or even alternating electrical pressure waves, and having a frequency the same or differing from those fed into the machine, may be produced with well known voltage conversion ratios and very high efficiencies when the said apparatus is fed with single or polyphase alternating currents, or pulsating currents, or continuous currents, of any voltage from very low values, say from 50 to 100, or even less, to several million or more. The conversion ratios mentioned above are those referring to the ratio of the effective to the maximum value of an electrical wave and to the number and method of connecting the applied source of such waves; that is, whether the machine is fed from a star or delta connected and 2, 3, 6, or $n$ phase source. The above ratios do not refer to the term "conversion ratio" as ordinarily applied to a static transformer (which ratio depends upon the relative number of turns in the primary and secondary), nor to the conversion ratio of an ordinary rotary converter which depends upon the number of phases fed to the machine and the mechanical and electrical design of such machine.

The current conversions mentioned in this application are accomplished by the production in any medium, either normally conducting or nonconducting, whose pressure, temperature or other physical characteristics may be varied, of one or a plurality of electrostatic fields of such character and so disposed with relation to each other as to cause a resultant rotating electrostatic field about a given axis and by rotating conductors about said axis, either synchronously or non-synchronously therewith.

The principles of the revolving electromagnetic field may be referred to here briefly for the purposes of illustrating the above action. If the direction and intensity of an electro-magnetic field be represented by the direction and length of a line, then by applying the ordinary parallelogram rule for the compounding of vectors, the resultant of two fields that differ in direction and magnitude may be found by compounding the vectors representing them and drawing the diagonal. Referring to Fig. 1, let OA and OB represent the components which go through periodic changes with a constant difference in phase; that is, if at any instant $OA_1$ represents the value and direction of field A and, similarly $OB_2$ represents the value and direction of field B, then $OY_1$ will represent the direction and magnitude of the resultant field, $OY_2$ and $OY_3$ being obtained in a like manner. Thus, if the variations of the two or more components follow the proper law the resultant may be caused to change continuously uniformly in direction without changing in magnitude; or, in other words, two or more alternating vectors may be arranged so as to produce as their resultant a rotating vector of constant magnitude and uniform angular velocity. If now referring to Fig. 2 A . . . A and B . . . B represent cross sections of two loops of conductors in quadrature with each other and two sine waves of electrical pressure differing by 90 degrees from each other be passed through the respective loops AA and BB, a revolving electro-magnetic field as above described will be set up about the axis O.

If the magnetic permeability of the medium surrounding the conductors AA and BB is low, the magnetic field resulting will be correspondingly weak, while if the electrical pressure of the sine wave be relatively high and the circuits of conductors AA and BB be open circuited the electrostatic field will be relatively stronger than the electro-magnetic field, and will predominate, and will revolve in the same manner as the electro-magnetic field.

As is well known, there is a certain critical relation between the electrical pressure which may be applied to a conductor and the radius of said conductor which may not be exceeded without causing the medium, depending upon the physical condition of said medium, surrounding said conductor to break down and form a conducting layer or corona therein. The term corona thus used signifies an electrostatic discharge of high pressure, and of smooth or uniform texture, color and density. The term "streamers" indicates a more or less concentrated electrostatic stress as evidenced by longer or ropy discharges approximating long arcs. Thus, if two parallel and perfectly uniform conductors be placed in a uniform medium and subjected to a sufficiently high potential, a perfectly uniform glow without arcs, sparks or streamers will become visible in the neighborhood of the conductors. If, now, points be affixed to the conductors, arcs, sparks or streamers will issue therefrom, because the electrostatic stress at these locations has been thereby increased beyond the rupturing gradient of the medium. The purpose of the points 18 in Fig. 4 is thus to increase the electrostatic stress in their neighborhood and to facilitate and localize the production of corona at these particular points, for corona is not desired in the neighborhood of conductors 24 and 25, except along such parts thereof as are comprehended between the extremities of conductors 13, 14 and 15. Also, to prevent arcs, sparks or streamer discharges from the points, if the voltage be excessive, they may be insulated by mica, glass, silica, porcelain or other suitable material of the proper thickness. If the voltage is not sufficient to produce such electrostatic stress in the neighborhood of the points and to rupture the surrounding air (and if the air is not ruptured in the neighborhood of the points it will not be in the neighborhood of the larger conductors 24, 25, 13, 14 and 15) the points need not be so insulated or protected. Experimental work on a machine adapted to produce the conversions herein described show that by covering said parts with glass, mica or other insulating material of that character that it is possible to filter out the streamers or sparks and prevent the burning of said points.

When corona is produced in air at atmospheric pressure, and if the voltage be gradually raised above that required for initial corona formation, arcs or streamers are seen to appear within said corona or electrostatic field and to extend from one conductor to the other. The presence of such arcs or streamers in this electrostatic field, produced for the purposes herein described, are undesirable and they may be suppressed or "filtered out" without affecting the true electrostatic field by surrounding one or all of the conductors with glass, or other suitable material, or with compressed air, or with oil, and such method of suppressing the arcing without affecting the electrostatic field desired, as described above, is deemed within the scope of this invention.

Referring again to Fig. 2 which is now intended to illustrate a resultant moving electrostatic field of uniform angular velocity and constant magnitude, if the conductors $a$, $b$, be moved in synchronism with said field and if said conductors pass within said conducting zone, corona or field and are thereby caused to follow and be in actual electrical contact with the electrostatic potential therein by virtue of immersion in said conducting zone or electrostatic field of constant magnitude, uni-directional, non-pulsating waves of electrical pressure may be obtained from combinations of such conductors by placing suitable collecting devices on and near the terminals thereof. If the above mentioned conductors be caused to lag or lead periodically or otherwise with respect to the said electrostatic field, uni-directional, pulsating or other waves of varying pressure may be obtained and such method is also deemed a part of this invention. Or, if in the illustrated apparatus, the conductors $a$, $b$, be fixed, a single phase alternating pressure wave may be produced, said wave having the frequency of the pressure waves in the conductors A . . . A and B . . . B. Again, if the conductors $a$ and $b$ be moved synchronously or non-synchronously with the moving field, but said field is the resultant of two or more sine or other waves varying in phase relation with respect to each other, said waves producing a field of varying magnitude, or speed, or both, the resultant rectified pressure wave in conductors $a$ and $b$ will also vary in magnitude although not in direction and pulsating or other non-uniform waves of pressure may be obtained therefrom.

If the conductors $a$ and $b$ be moved at a greater or less speed than, and in the same or the opposite direction from the movement of the resultant field, an alternating current of a frequency corresponding to the relative velocity of the conductors and said field will be produced.

The above sketches, while indicating only a two phase disposition of primary or stationary conductors (AA—BB) and a single pair of secondary or moving conductors (a—b), thereby making it possible to obtain only single phase or single sets of pulsating or non-pulsating waves therefrom, is presented only to simplify the illustrations. Any number of sets of primary and secondary conductors properly disposed with relation to each other and thereby making it possible to apply 2, 3, or 6 phase pressure waves, or any multiple thereof to the primary and to obtain single or multiphase pressure waves, alternating, pulsating, unidirectional or continuous from the secondary, as described elsewhere, are to be considered as a part of this invention. Or, if the machine is fed with continuous unidirectional current, and conductors a, b, are rotated within such field, alternating or pulsating waves may be obtained therefrom.

Having described the principle involved, which consists briefly in moving or holding fixed, a conductor, or conductors, within a moving or stationary electrostatic conducting field, and thereby maintaining actual electrical connection therewith and obtaining therefrom waves of electrical pressure, one form of apparatus to carry out the invention and method may here be described.

The numeral (1) represents a suitable drum of such strength as may be deemed necessary for given conditions, said drum being provided with lagging or insulation (2) if desired. The ends of the drum are provided with heads (3) suitably stiffened with ribs (4), said heads carrying bearings and stuffing boxes (5) and (6).

For a rectifier adapted to the reception of three phase currents there would be three leading-in conductors (7) (8) and (9) passed through insulating bushings (10) (11) and (12) and connected respectively to the three conductors (13) (14) and (15) disposed in planes 120° from each other. Conductors (13) (14) and (15) are mounted upon suitable insulators and pins as shown at (16) and (17) and carry suitable devices (18) in order to increase the electrostatic density in their neighborhood and throughout the conducting field and thus produce the desired conductivity of the corona in the surrounding medium; and (19) represents some material as glass, mica or other suitable material surrounding the conductors and adapted to withstand the heating and other effects consequent upon the passage of the electrostatic corona and to permit the passage thereof, but to prevent the passage of arcs or streamers.

Secured to the shaft (20) are four insulating members (21) two of which carry slip rings or conductors (22) and (23) of suitable shape upon their periphery. Active conductor (24) is connected electrically to collector (22) and active conductor (25) is connected electrically to collector (23). Said active conductors (24) and (25) having a similar set of devices (18) to those of active conductors (13) (14) and (15).

Insulating supports (26) are provided adapted to carry brushes or other collecting devices (27). And conductors (28) and (29) lead from said brushes through insulating bushings (30) and (31).

(32) represents a synchronous motor or other suitable device for rotating the shaft (20) at any desired speed.

Since it may be desirable to vary the radial distance between active conductors (13) (14) and (15) and (24) and (25), suitable adjustments (33) are provided whereby this may be accomplished, and by varying the distance between the fixed and rotating active conductors the machine may be operated throughout wide ranges of voltage, even with constant air pressure in the drum.

(34) represents a suitable pipe connection for conducting air to the interior of the drum and (35) a gage to indicate the pressure therein.

If, now, the leading-in terminals (7) (8) and (9) be connected to a high pressure three phase source a revolving electrostatic field will be set up about the shaft (20) and if the conductors mounted on said shaft are rotated by any suitable means in synchronism, or otherwise, as has been set forth herein, there will be a rectification of the three phase current fed to the machine in the manner described herein, provided the voltage used, the distance between the rotating and fixed conductors, thickness of the medium (19), and the air pressure, are suitably controlled.

If a three phase current of greater or less voltage is to be connected to the leading-in conductors, in order to render the device operative it is only necessary to change the distance between the revolving and fixed conductors, or the air pressure, or the geometric shape of the devices (18), or the thickness of the medium (19). In other words any combination of electric pressure in the field and atmospheric or mechanical pressure on the surrounding medium may be provided for as above, in order to prevent the disruption of the surrounding conducting medium, or for the purpose of limiting the extent and density of the corona.

While the above description of the apparatus mentions only a three phase conversion apparatus; i. e. one adapted to receive three phase alternating current and deliver direct or continuous current, the use of suitable designs for and involving the reception on the incoming side of polyphase currents of any character, single phase or pulsating currents, or direct or continuous currents, and the delivery from the apparatus of the corresponding transformed direct or alternating or pulsating currents, or waves of electrical pressure, are also deemed to be within the scope of this invention. Such incoming alternating currents need not bear constant phase relation to each other, nor is it necessary that they be of equal magnitude and they may have different maximum and intermediate values.

Having thus described my invention what I claim as new and desire to secure by Letters Patent of the United States is as follows: such modifications as come within the scope of the claims being expressly reserved.

1. A method of converting electrical pressure waves from one form into another form, which consists in maintaining a moving conducting electrostatic field or corona, subjecting electrical conductors to the influence of said field or corona, and withdrawing current from each of said conductors, substantially as described.

2. A method of converting electrical pressure waves from one form into another form, which comprises maintaining a moving conducting electrostatic field or corona, moving electrical conductors within the influence of said field, and withdrawing current from said conductors, substantially as set forth.

3. A method of converting electrical pressure waves from one form into another form, and controlling the character of the discharge, which consists in maintaining a rotating electrostatic field or corona, subjecting an electrical conductor to the influence of said field, suppressing undesirable arcing by controlling the pressure on the fluid in which said corona is formed, and withdrawing current from said conductors, substantially as described.

4. A method of converting electrical pressure waves from one form into another form, and controlling the character of the discharge, which consists in maintaining a rotating conducting electrostatic field or corona by means of such waves, suppressing undesirable arcing by controlling the pressure on the fluid in which said corona is formed, subjecting electrical conductors to the influence of said field or corona, and withdrawing current from said conductors, substantially as set forth.

5. A method of converting electrical pressure waves from one form into another form, which consists in maintaining a rotating conducting electrostatic field or corona by means of alternating electrical pressure waves moving electrical conductors within said field or corona, and withdrawing current from each conductor, substantially as set forth.

6. A method of converting electrical pressure waves from one form into another form, which consists in maintaining a rotating conducting electrostatic field or corona by means of an alternating electrical current, moving electrical conductors synchronously with said field, and withdrawing current from said conductors from said corona, as set forth.

7. A method of converting electrical pressure waves from one form into another form, which consists in maintaining a rotating conducting electrostatic field having a uniform angular velocity, moving conductors in and synchronously with said field, and withdrawing current therefrom, as set forth.

8. A method of converting electrical pressure waves from one form into another form, which consists in maintaining a rotating conducting electrostatic field having a uniform angular velocity by means of alternating currents, moving conductors at a determinate position in and synchronously with said rotating field, and withdrawing current therefrom, as set forth.

9. A method of converting electrical pressure waves from one form into another form, which consists in maintaining a rotating conducting electrostatic field having a substantially constant magnitude by means of an alternating electric current; rotating conductors at a determinate position in and synchronously with said field, and withdrawing current from each of said conductors, substantially as described.

10. In an apparatus of the described class, the combination of a series of conductors adapted to produce and maintain a rotating, conducting electrostatic field when fed with the proper current, means to increase the density of the field in the neighborhood of the conductors, conductors adapted to be subjected to the influence of said field, and means to withdraw current continuously from said last-mentioned conductors, substantially as set forth.

11. In an apparatus of the described class, the combination of a series of conductors adapted to produce and maintain a rotating, conducting electrostatic field when fed with the proper current, means on the surface of said conductors to increase the density of the field produced, revoluble conductors adapted to be subjected to the influence of said field, and means to withdraw current continuously from each of said revoluble conductors, substantially as set forth.

12. In an apparatus of the described class, the combination of a series of conductors adapted to produce and maintain a conducting electrostatic field when fed with the proper current, a member revoluble adjacent said conductors, non-conductors carried by said member, conductors carried by said non-conductors and collecting devices adapted to take current continuously from the movable conductors, substantially as set forth.

13. In the apparatus of the described class, the combination of a series of conductors adapted to produce and maintain a conducting electrostatic field when fed with the proper current, a revoluble member lying substantially in the axis of the said conductors, conductors carried by said revoluble member and adapted to be moved in said field, and non-conducting envelops surrounding the several conductors and means to withdraw current from the moving conductors, as set forth.

14. In an apparatus of the described class, the combination of a series of conductors adapted to produce and maintain a rotating conducting electrostatic field when fed with the proper current, a drum adapted to contain fluid at any desired pressure, and in which said conductors are placed, a revoluble member having substantially the same axis as that of the field, conductors carried by said revoluble member, and adapted to be revolved in proximity to the first-mentioned conductors, as set forth.

15. In an apparatus of the described class, the combination of a drum adapted to contain fluid at any desired pressure, conductors in said drum adapted to produce and maintain a rotating conducting electrostatic field when fed with the proper current, a revoluble member having substantially the same axis as that of said field, conductors carried by said member and adapted to be revolved in proximity to the first-mentioned conductors, non-conducting envelops for the several conductors, and means to withdraw current from the conductors on said revoluble member as set forth.

16. In an apparatus of the described class, the combination of a drum adapted to contain a fluid at any desired pressure, insulators carried by said drum on its interior, conductors carried by said insulators spaced from the drum and adapted to maintain a rotating conducting electrostatic field when fed with the proper current, a revoluble shaft passing substantially through the axis of said drum, insulators on said shaft, conductors carried by said insulators, non-conducting envelops for the several conductors, means to rotate the shaft synchronously with the field and collecting devices at the end of each revoluble conductor, as set forth.

17. In an apparatus of the described class the combination of a drum adapted to contain a fluid at any desired pressure, insulators carried by said drum on its interior, conductors carried by said insulators and symmetrically placed, a revoluble shaft passing through said drum, insulators on said shaft, and a pair of conductors carried by said insulators, a current collecting device for each of said latter conductors, and means to rotate said shaft at any desired rate, as set forth.

18. The method of rectifying electric currents which consists in producing successive positive corona discharges from a plurality of electrodes, subjecting a conductor successively to the positive corona discharges and withdrawing direct current from said conductor.

In testimony whereof I have set my hand this fifteenth day of May A. D. 1909, in the presence of the two subscribed witnesses.

RALPH W. LOHMAN.

Witnesses:
C. P. GRIFFIN,
A. K. DAGGETT.

Copies of this patent may be obtained for five cents each, by addressing the "Commissioner of Patents, Washington, D. C."